United States Patent [19]

Ottestad

[11] Patent Number: 5,685,563
[45] Date of Patent: Nov. 11, 1997

[54] COUNTERBALANCE SYSTEM FOR SHORT WHEELBASE VEHICLES

[76] Inventor: Jack B. Ottestad, P.O. Box 527, Genoa, Nev. 89411

[21] Appl. No.: 618,630

[22] Filed: Mar. 19, 1996

[51] Int. Cl.⁶ .................................................... B60R 21/13
[52] U.S. Cl. .......................... 780/458; 212/196; 414/719
[58] Field of Search ................................. 280/758, 759; 212/196, 197, 198; 414/673, 719

[56] References Cited

U.S. PATENT DOCUMENTS

| | | | |
|---|---|---|---|
| 3,924,753 | 12/1975 | Lamer et al. | 280/758 |
| 4,299,530 | 11/1981 | Schaeff | 280/758 |
| 4,861,069 | 8/1989 | Gunter | 280/758 |
| 5,131,802 | 7/1992 | Sunami et al. | 280/758 |

FOREIGN PATENT DOCUMENTS

| | | | |
|---|---|---|---|
| 3904227 | 8/1990 | Germany | 280/758 |
| 2160167 | 12/1985 | United Kingdom | 280/759 |

*Primary Examiner*—Paul N. Dickson
*Attorney, Agent, or Firm*—Donald D. Mon

[57] ABSTRACT

A counterbalance system for a vehicle having an axis of forward movement, a frame, and front and rear wheels spaced by a wheelbase dimension. A counterweight elides axially along a rail mounted to the frame, A power link mounted to the counterweight and connected to a linkage that is pivoted both to the counterweight and to the frame moves the counterweight forwardly or rearwardly to stabilize the vehicle at various load and slope conditions where the vehicle would otherwise be less stable.

10 Claims, 4 Drawing Sheets

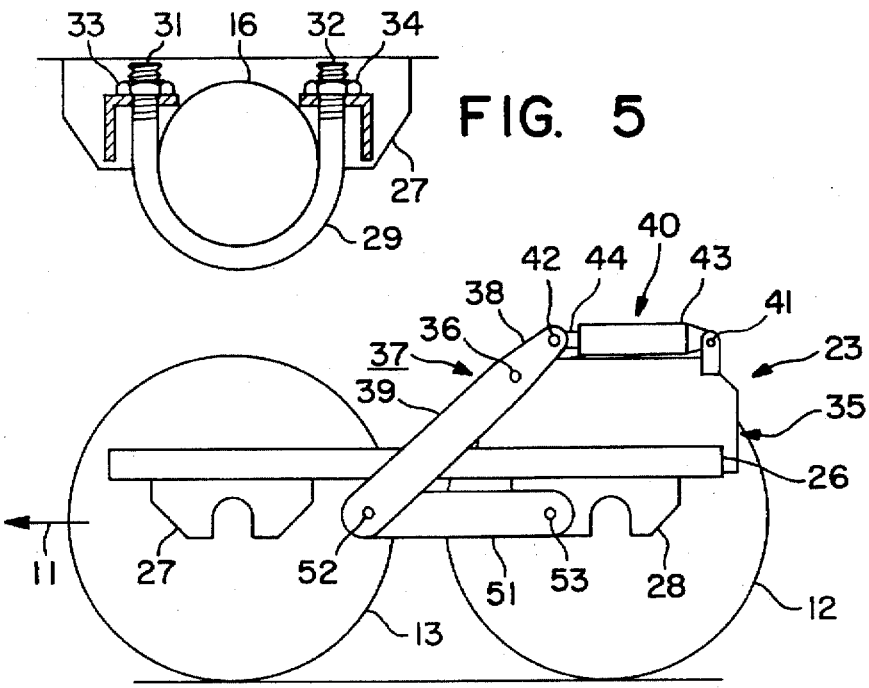
FIG. 5
FIG. 6
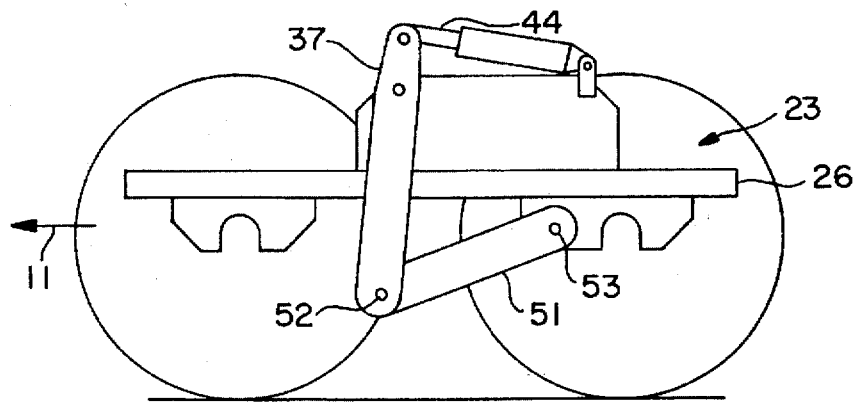
FIG. 7
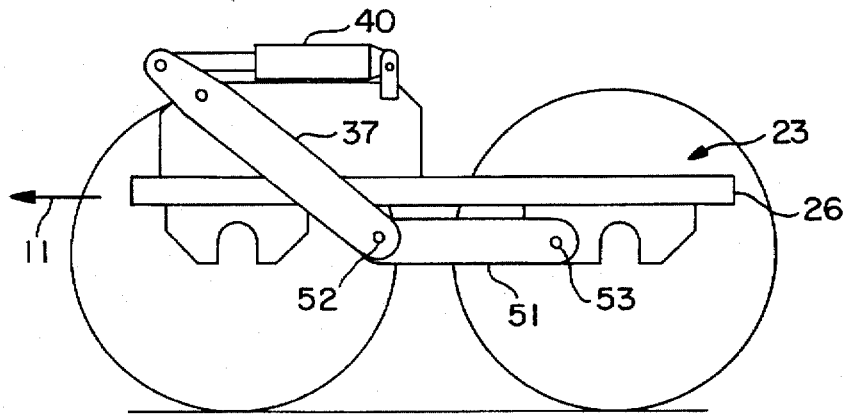
FIG. 8

COUNTERBALANCE SYSTEM FOR SHORT WHEELBASE VEHICLES

SPECIFICATION

FIELD OF THE INVENTION

A counterbalance system having a minimal dimensional envelope to provide stability for short wheelbase vehicles, especially for those equipped with forward loading scoops.

BACKGROUND OF THE INVENTION

Short wheelbase vehicles, especially those used in the demolition and construction trades, are expected to load, lift, carry and dump substantial weights of material. They are expected to climb up and go down rather steep inclines, and in some orientations such as dumping the load, to pass through some orientations where the rotational stability of the vehicle in the tipping-over mode is marginal.

An approach to solving this problem is to provide an appropriate counterweight. However, these vehicles are themselves designed to occupy a minimal dimensional envelope. Projection of counterbalance elements beyond the existing structure is not tolerable, and there is very little room in a vehicle such as skid steer loaders, an example of which is the well-known Bobcat tractor, in which to place any bulky element, or other known actuator means to adjust the system.

It is an object of this invention to provide a compact counterbalance system for short wheelbase vehicles such as the Bobcat which can fit within the existing structure, and whose actuation devices are readily received and actuated by conventional means generally already provided with such vehicles such as hydraulic power supplies.

BRIEF DESCRIPTION OF THE INVENTION

A counterbalance system according to this invention is intended to be mounted to a short wheelbase vehicle, especially a front-loading vehicle such as the Bobcat tractor. Such a vehicle characteristically has a pair of axle housings on each side, inboard of the wheels and outboard of the frame. The system of this invention is intended to be provided on both sides, and in its most convenient arrangement is clamped to the housings so that no modification of the vehicle structure is required in order to install the system.

The system comprises a rail extending parallel to the direction of forward motion of the vehicle. A counterweight is slidably placed on the rail.

A prime pivot on the counterweight pivotally mounts a lever to the counterweight. The lever has a force arm and a reaction arm on opposite sides of the prime pivot. The reaction arm is the longer of the two.

A power link pivotally connects the counterweight and the force arm at points spaced from the prime pivot. Power means is included in the power link. Changing the length of the power link will rotate the lever around the prime pivot.

Linkage means pivotally connects the reaction arm to the rail (or to the frame if preferred). Then rotation of the lever will cause the counterweight to move along the rail between a forward and a rearward location.

According to a preferred but optional feature of the invention, the power means comprises a hydraulic piston/cylinder assembly, and the linkage means comprises a rigid link pivoted to the rail and to the reaction arm.

According to yet another preferred but optional feature of the invention, hydraulic systems responsive to conditions in the lift arm of the tractor are provided.

The above and other features of the invention will be fully understood from the following detailed description and the accompanying drawings, in which:

BRIEF DESCRIPTION OF THE DRAWINGS

FIG. 5 shows means to hold the systems of FIG. 4 to a tractor;

FIGS. 5, 7 and 8 are schematic illustrations of successive positions of the counterweight;

DETAILED DESCRIPTION OF THE INVENTION

Figure 1:
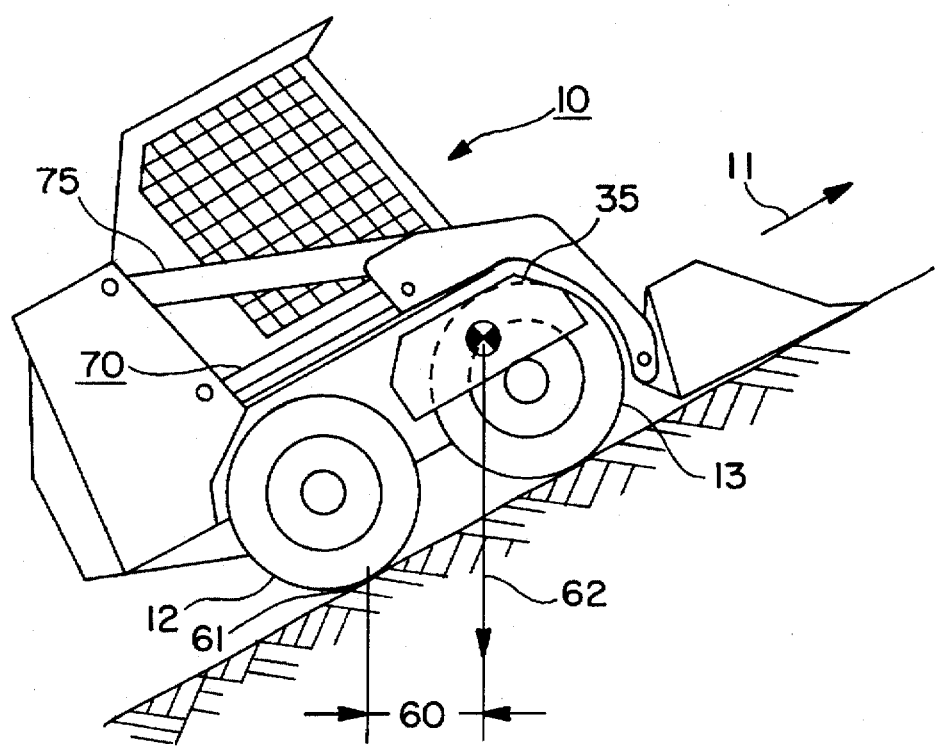
FIG. 1 is a side elevation, partly in schematic notation, showing the system of this invention in one of its operating configurations.
Figure 3:
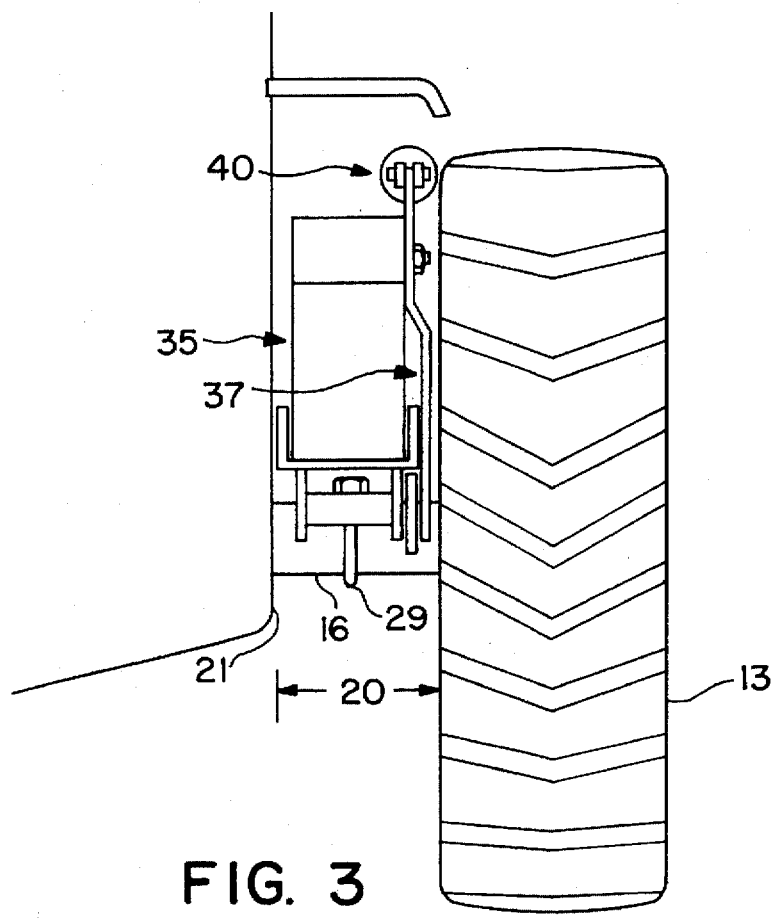
FIG. 3 is a fragmentary view, partly in cutaway cross-section, showing a portion of the tractor illustrated in FIGS. 1 and 2.

A short wheelbase tractor 10 is schematically shown in FIG. 1. It has an axis 11 of forward motion, four wheels of which only wheels 12 and 13 are shown (the tractor being symmetrical around its forward vertical axis) with axles (not shown) each fitted inside axle housings such as housing 16 (FIG. 3). There is a spacing 20 between frame 21 and the wheels in which the counterbalance system of this invention will fit. There is one of these systems 22, 23 on each side of the vehicle. Because they are identical, only one will be described in detail.

Figure 4:
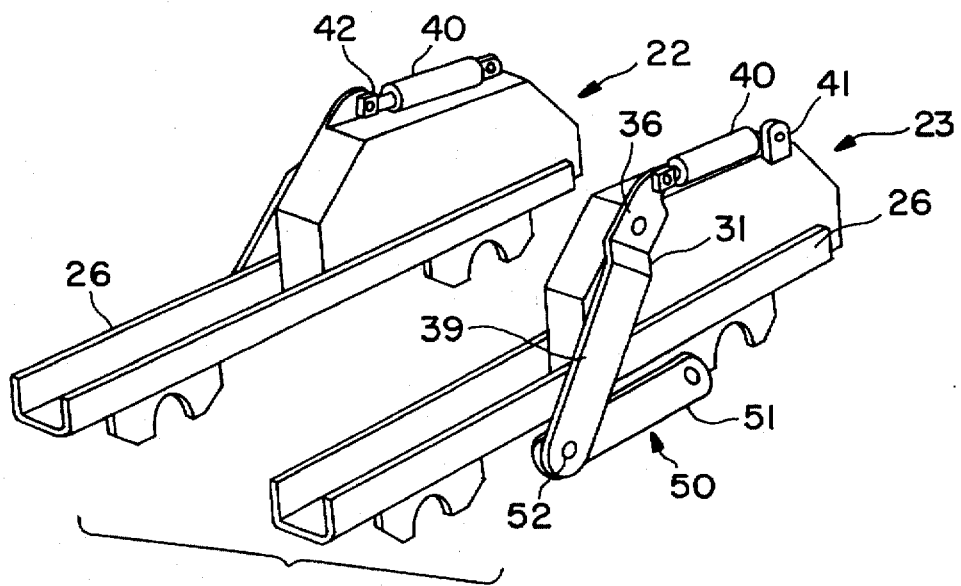
FIG. 4 is a separate perspective view of two systems according to this invention.

As best shown in FIG. 4, counterbalance system 23 includes a rail 26 rigidly mounted to the frame. Conveniently, saddles 28 are welded to the bottom of the channel-shaped rail, which fit over a respective axle housing. The rail may then be held to the frame by U clamps 29, whose threaded ends 31, 32 are engaged by nuts 33, 34.

A counterweight 35 is slidably fitted in the rail channel for forward and rearward movement. A prime pivot 36 on the counterweight rotationally mounts a lever 37 to the counterweight.

Lever 37 has a force arm 38 on one side of the prime pivot, and a reaction arm 39 on the other side. The reaction arm will be longer than the force arm for reasons to be seen. A ratio of about 5:1 has been used to advantage.

A power link 40 is pivotally mounted to the counterweight by pivot 41, and to the force arm by pivot 42 (FIG. 6). Power link 40 comprises a hydraulic piston/cylinder assembly 43 which can lengthen or shorten the power link as piston rod 44 is moved in and out of the cylinder. The lever will rotate around the prime pivot.

Linkage means 50 comprises a rigid link 51 pivotally connected by pivot 52 to the reaction arm at a point spaced from the prime pivot and by a pivot 53 to the rail, or an extension of the rail or even the frame itself. However, it is preferable to make the system unitary, and not to alter the frame. For purposes of this invention the rail will be regarded as part of the frame. The purpose of linkage means 50 is to accommodate the lateral component of motion of power link 40. If this were not provided, then the system would jam, or the counterweight would have to be raised or lowered, which would be very undesirable.

Instead of a pivoted rigid link 51, linkage means could instead be provided, in which a slot 56 in the reaction arm fits over a stub shaft on the rail or frame to react with the rail. However, this raises the problem of galling, and also of clogging up. It should be remembered that these vehicles work in very dirty environments, and it is better practice to use the simplest of linkages.

The force arm, power link, and structure between the prime pivot and pivot 41 comprises a force triangle with two sides of constant length, and one of variable length. Varying the length of the power link causes the lever to rotate, and the reaction arm to drive against the linkage means. The only element of the system which is free to move is the counterweight, and its location along the rail is determined by the length of the power link.

The substantial ratio of the length of the lever arms enables a large stroke of movement of the counterweight to be derived from a much smaller stroke of the piston/cylinder assembly. Accordingly this system can be fitted inside very close structure.

FIGS. 6, 7 and 8 show this movement, based on a 5:1 ratio of the arms. A cylinder with a 6 inch piston stroke can move the counterweight about 29½ inches, which is adequate for the Bobcat. Other strokes and ratios can be provided as desired. The movement of the counterweight between its forward and rearward locations is very swift. In fact, movement between the two locations in about two seconds is desirable in order to provide quick stabilizing in response to rapid tractor movement.

FIGS. 6–8 show the progressive movement of the counterweight from its rearward location (FIG. 6), through an intermediate location (FIG. 7), to its forward location (FIG. 8). This forward movement is caused by extension of force link 40. Travel of the counterweight to its rearward location will be caused by retraction of the piston rod into the cylinder.

FIG. 1 shows how the movement of the counterweight to its forward location can provide increased uphill stability. Observe the spring 60 between the point 61 of contract of the rear wheel and the vertical line 62 from the center of the counterweight—this forward torque provides improved resistance to rearward tip-over of the tractor.

Figure 2:
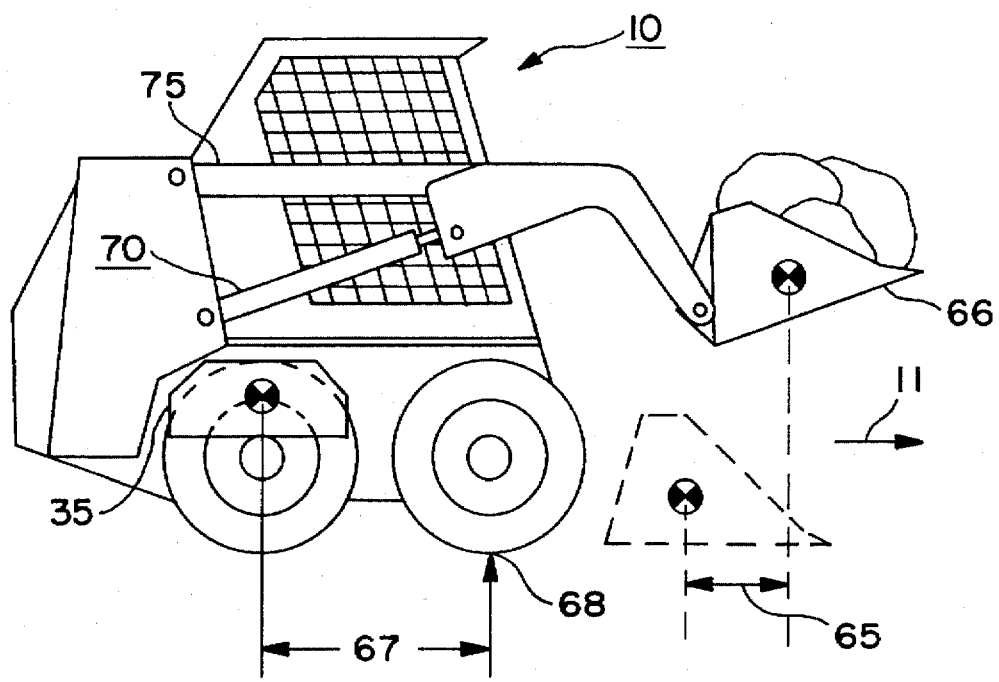
FIG. 2 is a side elevation, partly in fragmentary and partly in schematic notation, showing the system of this invention in another of its operating configurations.

FIG. 2 shows how stability can be improved, and liftable load can be increased. In fact on a conventional Bobcat, with the counterweight over the rear wheels, the liftable load can be increased by as much as 450 pounds when a 300 pound counterweight is used in each of the two counterbalance systems.

Notice in FIG. 2 the forward component 65 of movement of a bucket 66 while being lifted from the ground. Moving the counterweight to the illustrated rearward location provides a resistive leverage length 67 around the forward wheel contact 68.

Figure 9:
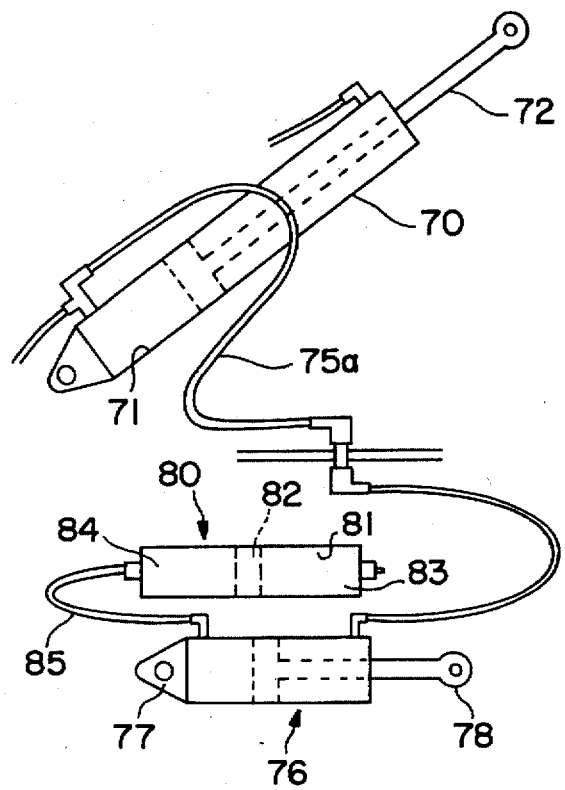
FIG. 9 is a schematic circuit drawing showing one embodiment of a control system for this invention.
Figure 10:
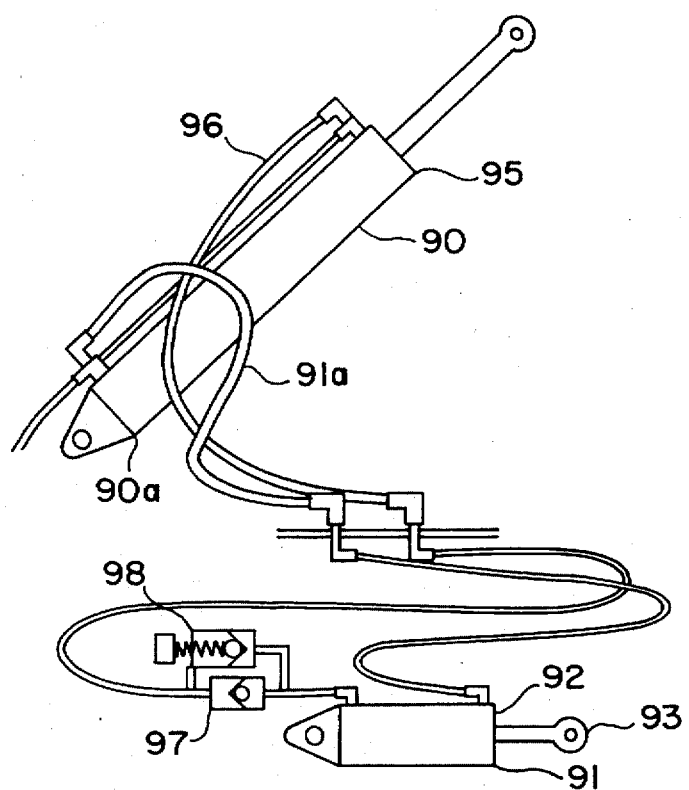
FIG. 10 is a schematic circuit drawing showing another embodiment of control system for this invention.

Although the position of the piston rod can be adjusted by manual valving controls, it is advantageous to provide a simple all-hydraulic systems which can be fully automatic. Such systems are shown in FIGS. 9 and 10.

Lift cylinder 70 (FIG. 9) comprises a hydraulic cylinder 71 and a piston/cylinder rod assembly 72. Fittings 73, 74 are provided for connecting the cylinder to the frame, and the rod to a lift arm 75 (FIGS. 1 and 2). Scoop 66 is mounted on the lift arm and the resulting axial force on the rod will be reflected in cylinder 71, which will be transmitted through hose 75a to a fitting on cylinder 76 which forms part of the power link. Its pivots 77, 78 are respectively attached to the force arm and to the counterweight, as previously described.

A balance cylinder 80 is mounted to the frame. It includes a cylinder 81 with a free piston 82, thereby forming two chambers 83, 84. Chamber 83 is pre-loaded with a gas under pressure, conveniently about 500 psi. Chamber 84 is connected by hose 85 to a fitting on the opposite side of the piston 86 in the power means from the fitting connected to hose 75. Thus, the piston in the power means is exposed to two opposing forces: the pressure from the balance cylinder, and pressure derived from the load on the lift arm (including the weight of the arm itself).

When the pressure in the lift cylinder exceeds that of the preload, then the power means will shift the counterbalance toward the rear wheels. After the load is dumped, the pressure will drop below that of the preload, and the preload pressure will move the piston in the power link to return the counterweight to its normal position, generally over the front axle.

An all-hydraulic system is shown in FIG. 10. A lift cylinder 90 is mounted to the tractor as in FIGS. 1 and 2. Its lower cylinder end 90a connected by hose 91a to cylinder 91, (the power link). Cylinder 92 is connected to the force arm, and the rod 93 to the counterweight, as before.

The upper cylinder end 95 is connected by hose 96 to a check value 97 and a parallel pressure relief/check valve 98.

In operation, to extend the power link (cylinder 91), the lift cylinder must be retracted under pressure. This will drive fluid into the right hand end of cylinder 91, causing extension of the rod, thereby moving the counterweight.

The systems of FIG. 9 and 10 are appropriately powered by the existing hydraulic system of the tractor.

This system provides a quick-response counterbalance for small vehicles, able to fit inside very limited space, and able to utilize power already in place.

This invention is not to be limited by the embodiments shown in the drawings and described in the description, which are given by way of example and not of limitation, but only in accordance with the scope of the appended claims.

I claim:

1. A counterbalance system for a vehicle having an axis of forward movement, a frame, and front and rear axles for front and rear wheels separated by a wheelbase dimension, said system comprising:

an axially extending rail adapted to be mounted rigidly to said frame between a forward location and a rearward location;

a counterweight mounted to said rail for axial sliding movement;

a prime pivot on said counterweight;

a lever pivotally mounted to said counterweight by said prime pivot, adapted to rotate in a plane parallel to said axis, said lever comprising a force arm on one side of said prime pivot, and a reaction arm on the other side of said prime pivot;

a power link pivotally mounted to said counterweight and to said force arm by pivots spaced from said prime pivot so as to form a force triangle comprising an imaginary line between the prime pivot and the pivot mounting the power link to the counterweight, the power link between the pivots mounting the power link to the counterweight and to the force arm, and structure of the force arm between the prime pivot and the pivot mounting the power link to the force arm, said power link including means to lengthen and shorten its length, whereby to rotate the lever around the prime pivot;

linkage means connected to said reaction arm at a pivot spaced from said prime pivot, said linkage means connectable to said frame at a pivot on said frame, the dimension of the reaction arm between said linkage means and said prime pivot being greater than the dimensions between the prime pivot and the pivot connecting the power link to the force arm;

whereby elongation or retraction of said power link causes the lever to rotate and thereby to move the counterweight along the rail between said forward and rearward locations in selected forward and rearward movements.

2. A counterbalance system according to claim 1 in which said power link comprises a hydraulic cylinder assembly compressing a piston so disposed and arranged as to change the length of said power link as the piston is caused to move in said cylinder.

3. A counterbalance system according to claim 1 in which said linkage means comprises a rigid link having a dimension of length pivotally attached to said reaction arm and to said rail, at points spaced from said prime pivot, whereby to compensate for lateral components of motion of said reaction arm.

4. A counterbalance system according to claim 3 in which said power link comprises a hydraulic cylinder assembly compressing a piston so disposed and arranged as to change the length of said power link as the piston is caused to move in said cylinder.

5. A counterbalance system according to claim 1 in which a pair of saddles are fixed to said rail for overhanging said axles so as to mount said system to said frame.

6. A vehicle having front and rear wheels and a frame, and the counterbalance system of claim 1 mounted to said frame.

7. A vehicle according to claim 6 in which said counterbalance system is provided at both sides of said vehicle.

8. A vehicle according to claim 7 in which a pair of saddles are fixed to each said rail, each said saddle overhanging a respective axle of the vehicle.

9. A counterbalance system according to claim 1 in which said vehicle further has a lift arm and a lift cylinder, said lift cylinder having a piston-rod combination in which lift is caused by exertion of pressure, and lowering is caused by the weight of the lift arm, said system further including:

a gas pre-loaded free cylinder assembly comprising a piston connected to one side of said power link, whereby said power link is extended when a sufficient pressure is generated by the weight of the lift arm with a load.

10. A counterbalance system according to claim 1 in which said vehicle has a lift arm and a lift cylinder, said lift cylinder having a piston-rod combination in which lift is caused by exertion of pressure, and lowering is caused by the weight of the lift arm, in response to control by an operator, said system further including:

hose connections positionable between ends of the lift cylinder and said power link, one of said hose connections including a parallel check valve and pressure relief valve.

* * * * *